(12) United States Patent
Ha et al.

(10) Patent No.: US 12,198,245 B2
(45) Date of Patent: Jan. 14, 2025

(54) THREE-DIMENSIONAL (3D) RENDERING METHOD AND APPARATUS

(71) Applicant: Samsung Electronics Co., Ltd., Suwon-si (KR)

(72) Inventors: Inwoo Ha, Seongnam-si (KR); Hyun Sung Chang, Seoul (KR); Nahyup Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 16/879,955

(22) Filed: May 21, 2020

(65) Prior Publication Data

US 2021/0074052 A1    Mar. 11, 2021

(30) Foreign Application Priority Data

Sep. 9, 2019   (KR) .................. 10-2019-0111734

(51) Int. Cl.
| | | |
|---|---|---|
| G06T 15/00 | (2011.01) | |
| G06N 3/08 | (2023.01) | |
| G06T 7/529 | (2017.01) | |
| G06T 15/06 | (2011.01) | |
| G06T 15/83 | (2011.01) | |
| G06T 1/20 | (2006.01) | |

(52) U.S. Cl.
CPC ............. *G06T 15/005* (2013.01); *G06N 3/08* (2013.01); *G06T 7/529* (2017.01); *G06T 15/06* (2013.01); *G06T 15/83* (2013.01); *G06T 1/20* (2013.01)

(58) Field of Classification Search
CPC ....... G06T 15/005; G06T 7/529; G06T 15/06; G06T 15/83; G06T 1/20; G06N 3/08; G06N 3/088; G06N 3/0445; G06N 3/0454
See application file for complete search history.

(56) References Cited

U.S. PATENT DOCUMENTS

| | | | | |
|---|---|---|---|---|
| 4,897,806 A | * | 1/1990 | Cook ................... | G06T 15/503 345/611 |
| 5,305,430 A | * | 4/1994 | Glassner ............... | G06T 15/50 345/581 |
| 5,488,700 A | * | 1/1996 | Glassner ............... | G06T 15/506 345/589 |
| 5,808,619 A | * | 9/1998 | Choi ..................... | G06T 15/83 345/426 |

(Continued)

FOREIGN PATENT DOCUMENTS

| | | |
|---|---|---|
| EP | 3 349 181 A1 | 7/2018 |
| KR | 10-2015-0098458 A | 8/2015 |
| KR | 10-2015-0128536 A | 11/2015 |

OTHER PUBLICATIONS

Extended European Search Report issued on Feb. 1, 2021 in counterpart EP Application No. 20191593.1 (8 pages in English).

(Continued)

*Primary Examiner* — Charles L Beard
(74) *Attorney, Agent, or Firm* — NSIP Law

(57) ABSTRACT

A three-dimensional (3D) rendering method includes extracting sample points from a 3D scene, acquiring rendering result information for the sample points by rendering the sample points, and generating a rendering result image corresponding to an entire rendering based on the rendering result information for the sample points and feature information of the 3D scene.

31 Claims, 11 Drawing Sheets

(56) References Cited

U.S. PATENT DOCUMENTS

| | | | | |
|---|---|---|---|---|
| 5,946,479 A * | 8/1999 | Sakaguchi | G06F 17/10 | 716/51 |
| 6,014,143 A * | 1/2000 | Naqvi | G06T 15/40 | 345/427 |
| 6,016,150 A * | 1/2000 | Lengyel | G06T 15/04 | 345/589 |
| 6,064,393 A * | 5/2000 | Lengyel | G06T 15/005 | 345/473 |
| 6,262,738 B1 * | 7/2001 | Gibson | H04N 13/128 | 345/419 |
| 6,278,460 B1 * | 8/2001 | Myers | G06T 15/06 | 382/154 |
| 6,281,904 B1 * | 8/2001 | Reinhardt | G06T 15/04 | 345/589 |
| 6,359,618 B1 * | 3/2002 | Heirich | G06T 15/04 | 345/426 |
| 6,526,166 B1 * | 2/2003 | Gorman | G06T 7/579 | 382/154 |
| 7,193,633 B1 * | 3/2007 | Reinhardt | G06T 17/10 | 345/619 |
| 7,426,437 B2 * | 9/2008 | Breed | G01S 19/17 | 340/995.12 |
| 7,564,457 B2 * | 7/2009 | Cook | G06T 13/00 | 345/422 |
| 8,405,657 B2 * | 3/2013 | Breton | G06T 15/50 | 345/426 |
| 8,493,383 B1 * | 7/2013 | Cook | G06T 15/06 | 345/589 |
| 8,643,701 B2 * | 2/2014 | Nguyen | H04N 13/30 | 348/47 |
| 9,001,128 B2 * | 4/2015 | Anderson | G06T 13/40 | 345/473 |
| 9,082,217 B1 * | 7/2015 | Mckenzie | G06T 15/06 | |
| 9,087,017 B2 | 7/2015 | Mace et al. | | |
| 9,104,702 B2 * | 8/2015 | Takahashi | G06T 11/00 | |
| 9,218,689 B1 * | 12/2015 | Baldwin | G06T 7/60 | |
| 9,269,183 B1 * | 2/2016 | Laine | G06T 15/503 | |
| 9,300,946 B2 * | 3/2016 | Do | H04N 13/257 | |
| 9,495,796 B2 * | 11/2016 | Breton | G06T 15/50 | |
| 9,646,410 B2 * | 5/2017 | Collet Romea | G06T 7/33 | |
| 10,008,027 B1 * | 6/2018 | Baker | G06T 7/50 | |
| 10,147,216 B1 * | 12/2018 | Miao | G06T 7/194 | |
| 10,185,463 B2 * | 1/2019 | You | G06F 3/04845 | |
| 10,235,601 B1 | 3/2019 | Wrenninge et al. | | |
| 10,249,077 B2 * | 4/2019 | Laurent | G06T 17/20 | |
| 10,255,480 B2 * | 4/2019 | Uhlenbrock | G06T 7/001 | |
| 10,282,902 B1 * | 5/2019 | Mishra | G06T 17/20 | |
| 10,297,070 B1 * | 5/2019 | Zhu | G06V 30/19173 | |
| 10,366,510 B1 * | 7/2019 | Malti | G06T 19/006 | |
| 10,410,401 B1 * | 9/2019 | Bakalash | G06T 15/506 | |
| 10,475,227 B1 * | 11/2019 | Pajerski | G06T 15/08 | |
| 10,559,086 B1 * | 2/2020 | Miller | H04N 23/45 | |
| 10,607,567 B1 * | 3/2020 | Schritter | G09G 5/06 | |
| 10,621,747 B2 * | 4/2020 | Malisiewicz | G06N 3/044 | |
| 10,665,011 B1 * | 5/2020 | Sunkavalli | G06N 3/084 | |
| 10,672,143 B2 * | 6/2020 | Lam | G06T 7/564 | |
| 10,885,701 B1 * | 1/2021 | Patel | A63F 13/57 | |
| 10,902,670 B1 * | 1/2021 | Schied | G06T 15/506 | |
| 11,055,910 B1 * | 7/2021 | Deng | G06V 20/647 | |
| 11,256,958 B1 * | 2/2022 | Subbiah | G06F 18/2155 | |
| 11,282,277 B1 * | 3/2022 | Phogat | G06T 15/005 | |
| 11,328,474 B2 * | 5/2022 | Harviainen | H04N 13/117 | |
| 11,417,069 B1 * | 8/2022 | Gupta | G06V 20/70 | |
| 11,574,449 B1 * | 2/2023 | Anderegg | G06T 15/005 | |
| 11,580,691 B2 * | 2/2023 | Marin | H04N 13/254 | |
| 11,625,909 B1 * | 4/2023 | Zhou | G06V 10/806 | 382/103 |
| 11,908,067 B1 * | 2/2024 | Fang | G06T 15/20 | |
| 2001/0055019 A1 * | 12/2001 | Sowizral | G06T 1/20 | 345/441 |
| 2002/0057838 A1 * | 5/2002 | Steger | G06V 10/7515 | 382/197 |
| 2002/0061194 A1 * | 5/2002 | Wu | G03B 35/00 | 396/324 |
| 2005/0179686 A1 * | 8/2005 | Christensen | G06T 15/40 | 345/423 |
| 2006/0018539 A1 * | 1/2006 | Sato | G06V 10/20 | 382/173 |
| 2006/0284880 A1 * | 12/2006 | Zhou | G06T 15/04 | 345/582 |
| 2007/0046686 A1 * | 3/2007 | Keller | G06F 17/10 | 345/581 |
| 2008/0100621 A1 * | 5/2008 | Aharon | G06T 17/20 | 345/424 |
| 2008/0247635 A1 * | 10/2008 | Davis | G06T 19/00 | 382/152 |
| 2008/0247636 A1 * | 10/2008 | Davis | G09G 5/00 | 382/152 |
| 2009/0015585 A1 * | 1/2009 | Klusza | G06F 16/51 | 345/420 |
| 2009/0021513 A1 * | 1/2009 | Joshi | G06T 15/005 | 345/419 |
| 2009/0033661 A1 * | 2/2009 | Miller | G06T 15/60 | 345/426 |
| 2009/0041340 A1 * | 2/2009 | Suzuki | G06T 7/00 | 382/159 |
| 2009/0103814 A1 * | 4/2009 | Nakamura | G06V 10/462 | 382/201 |
| 2009/0171627 A1 * | 7/2009 | Olson | G06T 17/00 | 703/2 |
| 2009/0323121 A1 * | 12/2009 | Valkenburg | G01C 15/002 | 358/1.18 |
| 2010/0289798 A1 * | 11/2010 | Furuta | G06T 15/04 | 345/419 |
| 2010/0290712 A1 * | 11/2010 | Furuta | G06T 15/04 | 382/244 |
| 2011/0032256 A1 * | 2/2011 | Ha | G06T 15/60 | 345/420 |
| 2011/0069068 A1 * | 3/2011 | Ha | G06T 15/60 | 345/426 |
| 2011/0090252 A1 * | 4/2011 | Yoon | G06T 19/006 | 345/633 |
| 2011/0194731 A1 * | 8/2011 | BenHimane | G06T 7/246 | 382/103 |
| 2011/0267344 A1 * | 11/2011 | Germann | G06V 20/64 | 382/154 |
| 2012/0120199 A1 * | 5/2012 | Ben Himane | G06T 7/75 | 348/46 |
| 2012/0299922 A1 * | 11/2012 | Ha | G06T 15/506 | 345/426 |
| 2013/0005458 A1 * | 1/2013 | Kosta | G07F 9/001 | 463/31 |
| 2013/0027417 A1 * | 1/2013 | Merrell | G06T 15/06 | 345/660 |
| 2013/0173225 A1 * | 7/2013 | Cai | G06F 30/23 | 703/1 |
| 2013/0245828 A1 * | 9/2013 | Tateno | G06V 20/653 | 700/259 |
| 2013/0251288 A1 * | 9/2013 | Kobiki | G06T 5/73 | 382/298 |
| 2013/0335434 A1 | 12/2013 | Wang et al. | | |
| 2014/0016825 A1 * | 1/2014 | Kasahara | G06T 7/20 | 382/103 |
| 2014/0043329 A1 * | 2/2014 | Wang | G06T 17/20 | 345/420 |
| 2014/0092307 A1 * | 4/2014 | Fukuda | H04N 9/3194 | 348/571 |
| 2014/0146049 A1 * | 5/2014 | Ozdas | G06T 15/06 | 345/426 |
| 2014/0253553 A1 * | 9/2014 | Jovanovic | G06F 3/04883 | 345/427 |
| 2014/0267346 A1 * | 9/2014 | Ren | G06T 15/04 | 345/582 |
| 2014/0341464 A1 * | 11/2014 | Fan | G06T 7/194 | 382/154 |
| 2014/0369661 A1 * | 12/2014 | Partouche | G06T 13/20 | 386/227 |

(56) References Cited

U.S. PATENT DOCUMENTS

| | | | |
|---|---|---|---|
| 2015/0002510 A1* | 1/2015 | Takayama | G06T 17/205 345/423 |
| 2015/0009214 A1* | 1/2015 | Lee | G06T 17/10 345/420 |
| 2015/0022524 A1* | 1/2015 | Ahn | G06T 15/50 345/426 |
| 2015/0023602 A1* | 1/2015 | Wnuk | G06V 20/20 382/190 |
| 2015/0035825 A1* | 2/2015 | Zhou | G06T 7/251 345/419 |
| 2015/0201176 A1 | 7/2015 | Graziosi et al. | |
| 2015/0228110 A1* | 8/2015 | Hecht | G06T 15/50 345/419 |
| 2015/0235410 A1* | 8/2015 | Ha | G06T 15/40 345/426 |
| 2015/0262407 A1* | 9/2015 | Fursund | G06T 15/80 345/426 |
| 2015/0279075 A1* | 10/2015 | Myers | G06T 13/20 345/474 |
| 2015/0348314 A1* | 12/2015 | Koguchi | G06T 15/506 345/420 |
| 2016/0071318 A1* | 3/2016 | Lee | G06V 20/653 345/419 |
| 2016/0104314 A1* | 4/2016 | Nakazato | G06T 17/00 382/285 |
| 2016/0163104 A1* | 6/2016 | Hou | G06T 5/77 345/520 |
| 2016/0379041 A1* | 12/2016 | Rhee | G06V 10/32 382/118 |
| 2017/0046563 A1* | 2/2017 | Kim | G06F 18/217 |
| 2017/0069129 A1* | 3/2017 | Mendez | G06T 15/08 |
| 2017/0084076 A1* | 3/2017 | Ha | G06T 17/10 |
| 2017/0091992 A1* | 3/2017 | Rogers | G06T 17/20 |
| 2017/0132451 A1* | 5/2017 | Namiki | G06V 10/757 |
| 2017/0132830 A1* | 5/2017 | Ha | G06T 15/80 |
| 2017/0227636 A1 | 8/2017 | Moulder et al. | |
| 2017/0227765 A1* | 8/2017 | Mammou | H04L 65/80 |
| 2017/0228927 A1* | 8/2017 | Sugimura | H04N 7/181 |
| 2017/0236325 A1* | 8/2017 | Lecocq | G06T 15/55 345/426 |
| 2017/0243397 A1* | 8/2017 | Hou | G06V 10/426 |
| 2017/0263047 A1* | 9/2017 | Mima | G06T 15/60 |
| 2017/0278293 A1* | 9/2017 | Hsu | G06T 11/001 |
| 2017/0309059 A1* | 10/2017 | Howson | G06T 1/20 |
| 2017/0337726 A1* | 11/2017 | Bui | G06T 7/97 |
| 2017/0365089 A1 | 12/2017 | Mitchell et al. | |
| 2017/0374344 A1* | 12/2017 | Boulton | G06T 19/00 |
| 2018/0005049 A1* | 1/2018 | Dodd | G06V 20/56 |
| 2018/0020207 A1* | 1/2018 | Sugimura | G01B 11/002 |
| 2018/0040155 A1* | 2/2018 | Lecgcg | G06T 15/50 |
| 2018/0061119 A1* | 3/2018 | Pharr | G06T 15/005 |
| 2018/0099201 A1* | 4/2018 | Marty | G06V 40/23 |
| 2018/0137642 A1* | 5/2018 | Malisiewicz | G06V 10/454 |
| 2018/0144535 A1* | 5/2018 | Ford | G06T 15/005 |
| 2018/0174354 A1* | 6/2018 | Dufay | G06T 15/506 |
| 2018/0176483 A1* | 6/2018 | Knorr | H04N 5/2723 |
| 2018/0203112 A1* | 7/2018 | Mannion | H04R 1/406 |
| 2018/0205963 A1* | 7/2018 | Matei | H04N 21/85406 |
| 2018/0218510 A1* | 8/2018 | Taguchi | G06T 7/55 |
| 2018/0218511 A1* | 8/2018 | Chan | H04N 19/54 |
| 2018/0232906 A1* | 8/2018 | Kim | G06T 7/246 |
| 2018/0240268 A1 | 8/2018 | Nevraev et al. | |
| 2018/0293710 A1 | 10/2018 | Meyer et al. | |
| 2018/0293713 A1 | 10/2018 | Vogels et al. | |
| 2018/0322623 A1* | 11/2018 | Memo | G06N 3/084 |
| 2018/0350128 A1* | 12/2018 | Bakalash | G06T 15/506 |
| 2018/0350134 A1* | 12/2018 | Lodato | G06T 17/20 |
| 2018/0357819 A1* | 12/2018 | Oprea | G06T 19/00 |
| 2018/0365880 A1 | 12/2018 | Bakalash et al. | |
| 2018/0374260 A1 | 12/2018 | Koyalazov et al. | |
| 2019/0005666 A1* | 1/2019 | Nakagawa | G06T 7/00 |
| 2019/0005668 A1* | 1/2019 | Sugimura | G06T 7/73 |
| 2019/0033085 A1* | 1/2019 | Ogale | G01C 21/3446 |
| 2019/0057544 A1* | 2/2019 | Lecocq | G06T 15/60 |
| 2019/0064801 A1* | 2/2019 | Frazzoli | B60W 60/0053 |
| 2019/0072973 A1* | 3/2019 | Sun | B62D 15/025 |
| 2019/0073825 A1* | 3/2019 | Lee | G06T 17/00 |
| 2019/0088004 A1* | 3/2019 | Lucas | G06T 19/20 |
| 2019/0102865 A1 | 4/2019 | Hensley et al. | |
| 2019/0108396 A1* | 4/2019 | Dal Mutto | G06F 18/24 |
| 2019/0122377 A1* | 4/2019 | Chen | G06T 7/55 |
| 2019/0130639 A1* | 5/2019 | Boyce | G06F 3/013 |
| 2019/0132603 A1 | 5/2019 | Surti et al. | |
| 2019/0147221 A1* | 5/2019 | Grabner | G06T 7/75 382/103 |
| 2019/0172238 A1* | 6/2019 | Miao | G06T 5/70 |
| 2019/0197134 A1* | 6/2019 | Reyes Martinez | G06F 16/5866 |
| 2019/0197331 A1* | 6/2019 | Kwak | G06V 40/50 |
| 2019/0213389 A1* | 7/2019 | Peruch | G01B 11/00 |
| 2019/0228263 A1* | 7/2019 | Szeto | G02B 27/017 |
| 2019/0244412 A1* | 8/2019 | Yago Vicente | G06T 17/20 |
| 2019/0287294 A1* | 9/2019 | Liu | G06T 5/70 |
| 2019/0289281 A1* | 9/2019 | Badrinarayanan | G06T 5/60 |
| 2019/0295315 A1* | 9/2019 | Levinson | G06T 17/20 |
| 2019/0295318 A1* | 9/2019 | Levinson | G06N 20/00 |
| 2019/0303725 A1* | 10/2019 | Gurvich | G06V 10/82 |
| 2019/0304134 A1* | 10/2019 | Mauchly | G06T 15/20 |
| 2019/0304163 A1* | 10/2019 | Bakalash | G06T 15/06 |
| 2019/0304172 A1* | 10/2019 | Ha | G06T 15/40 |
| 2019/0311467 A1* | 10/2019 | Neulander | G06T 15/503 |
| 2019/0340649 A1* | 11/2019 | Ayush | G06V 10/255 |
| 2019/0347845 A1* | 11/2019 | Makar | G06T 15/80 |
| 2019/0362035 A1* | 11/2019 | Jeschke | G06T 13/60 |
| 2019/0362539 A1* | 11/2019 | Kurz | G06T 19/006 |
| 2019/0371060 A1* | 12/2019 | Energin | G06T 19/006 |
| 2019/0373704 A1* | 12/2019 | Cristiani | G01J 1/0266 |
| 2019/0378204 A1* | 12/2019 | Ayush | G06Q 30/0643 |
| 2019/0378323 A1* | 12/2019 | Bakalash | G06T 15/06 |
| 2019/0392587 A1* | 12/2019 | Nowozin | G06N 3/045 |
| 2020/0025935 A1* | 1/2020 | Liang | G06V 20/64 |
| 2020/0058155 A1* | 2/2020 | Bakalash | G06T 15/40 |
| 2020/0058156 A1* | 2/2020 | Tran | G06V 20/653 |
| 2020/0064119 A1* | 2/2020 | Gordon | G06T 7/73 |
| 2020/0073909 A1* | 3/2020 | Kumar | G06F 17/14 |
| 2020/0082624 A1* | 3/2020 | Murphy-Chutorian | G06T 19/006 |
| 2020/0082632 A1* | 3/2020 | Burns | G06T 19/20 |
| 2020/0085404 A1* | 3/2020 | Siewerdsen | G06T 5/60 |
| 2020/0086858 A1* | 3/2020 | Yao | B60W 30/0956 |
| 2020/0098168 A1* | 3/2020 | Le | G06N 20/00 |
| 2020/0118327 A1* | 4/2020 | Kawamata | G06T 15/20 |
| 2020/0151938 A1* | 5/2020 | Shechtman | G06N 3/045 |
| 2020/0160616 A1* | 5/2020 | Li | G06V 10/776 |
| 2020/0174490 A1* | 6/2020 | Ogale | G06N 3/045 |
| 2020/0193591 A1* | 6/2020 | Kamiyama | G06T 7/60 |
| 2020/0225737 A1* | 7/2020 | Limor | G06T 15/60 |
| 2020/0273090 A1* | 8/2020 | Ayush | G06T 7/75 |
| 2020/0302241 A1* | 9/2020 | White | G06V 10/772 |
| 2020/0312003 A1* | 10/2020 | Borovikov | A63F 13/213 |
| 2020/0320685 A1* | 10/2020 | Anssari Moin | G06V 10/26 |
| 2020/0334897 A1* | 10/2020 | Oved | G06T 11/003 |
| 2020/0341466 A1* | 10/2020 | Pham | G08G 1/166 |
| 2020/0356827 A1* | 11/2020 | Dinerstein | G06F 18/213 |
| 2020/0364509 A1* | 11/2020 | Weinzaepfel | G06F 18/214 |
| 2020/0364876 A1* | 11/2020 | Mohan | G06V 10/454 |
| 2020/0380787 A1* | 12/2020 | Croxford | G06T 19/006 |
| 2020/0380790 A1* | 12/2020 | Bédard | G06T 15/60 |
| 2020/0387698 A1* | 12/2020 | Yi | G06N 3/084 |
| 2020/0401617 A1* | 12/2020 | Spiegel | G06F 16/587 |
| 2021/0009163 A1* | 1/2021 | Urtasun | G08G 1/20 |
| 2021/0035356 A1* | 2/2021 | Castaneda | G06T 15/506 |
| 2021/0042992 A1* | 2/2021 | Newman | G06T 19/006 |
| 2021/0065440 A1* | 3/2021 | Sunkavalli | G06T 7/90 |
| 2021/0074052 A1* | 3/2021 | Ha | G06T 15/005 |
| 2021/0082184 A1* | 3/2021 | Claessen | G06N 3/08 |
| 2021/0090301 A1* | 3/2021 | Mammou | G06T 7/11 |
| 2021/0118160 A1* | 4/2021 | Farås | G06T 7/73 |
| 2021/0124982 A1* | 4/2021 | Suwelack | G06V 10/764 |
| 2021/0133976 A1* | 5/2021 | Carmi | G16H 30/20 |
| 2021/0150267 A1* | 5/2021 | Boulanger | G06F 18/214 |
| 2021/0150702 A1* | 5/2021 | Claessen | G06T 17/10 |
| 2021/0150726 A1* | 5/2021 | Kao | G06T 7/168 |
| 2021/0158139 A1* | 5/2021 | Mai | G06T 5/50 |

(56) References Cited

U.S. PATENT DOCUMENTS

| | | | |
|---|---|---|---|
| 2021/0166477 A1* | 6/2021 | Bunkasem | G06V 10/776 |
| 2021/0183133 A1* | 6/2021 | Kaminiski | G06T 13/40 |
| 2021/0183141 A1* | 6/2021 | Zhou | G06V 40/175 |
| 2021/0191004 A1* | 6/2021 | Kusama | G02B 5/0278 |
| 2021/0201077 A1* | 7/2021 | Lwowski | G06V 20/10 |
| 2021/0209797 A1* | 7/2021 | Lee | G06T 17/00 |
| 2021/0209849 A1* | 7/2021 | Lee | G06T 17/20 |
| 2021/0224516 A1* | 7/2021 | Jain | G06F 18/2431 |
| 2021/0225073 A1* | 7/2021 | Tytgat | G06T 17/20 |
| 2021/0233303 A1* | 7/2021 | Takahashi | G06T 9/00 |
| 2021/0243362 A1* | 8/2021 | Castillo | H04N 23/61 |
| 2021/0272086 A1* | 9/2021 | Buibas | G06Q 30/06 |
| 2021/0274147 A1* | 9/2021 | Fleureau | H04N 21/234 |
| 2021/0275925 A1* | 9/2021 | Kolen | G06N 3/047 |
| 2021/0286977 A1* | 9/2021 | Chen | G06N 3/045 |
| 2021/0295592 A1* | 9/2021 | von Cramon | G06N 3/08 |
| 2021/0295606 A1* | 9/2021 | Kim | G06T 17/20 |
| 2021/0302584 A1* | 9/2021 | Luo | G06T 7/73 |
| 2021/0308869 A1* | 10/2021 | Tang | G06N 3/045 |
| 2021/0312655 A1* | 10/2021 | Tang | G06N 3/08 |
| 2021/0312701 A1* | 10/2021 | Vrcelj | G06T 15/40 |
| 2021/0329306 A1* | 10/2021 | Liu | G06V 40/168 |
| 2021/0383096 A1* | 12/2021 | White | G06N 20/00 |
| 2021/0383590 A1* | 12/2021 | Roimela | H04N 19/597 |
| 2021/0398351 A1* | 12/2021 | Papandreou | G06N 3/08 |
| 2021/0406575 A1* | 12/2021 | Wiggeshoff | G06T 19/00 |
| 2022/0036641 A1* | 2/2022 | Vorba | G06T 15/06 |
| 2022/0058866 A1* | 2/2022 | Beltrand | G06N 3/08 |
| 2022/0092330 A1* | 3/2022 | Amano | G06T 7/55 |
| 2022/0148135 A1* | 5/2022 | Isik | G06T 5/70 |
| 2022/0148250 A1* | 5/2022 | Kocdemir | G06T 15/005 |
| 2022/0172427 A1* | 6/2022 | Lino | G06T 15/205 |
| 2022/0198737 A1* | 6/2022 | Enthed | G06T 7/40 |
| 2022/0198738 A1* | 6/2022 | Xu | G06T 17/00 |
| 2022/0214457 A1* | 7/2022 | Liang | G06N 3/04 |
| 2022/0270297 A1* | 8/2022 | Koh | G06T 7/60 |
| 2022/0277476 A1* | 9/2022 | Sagong | G06F 3/011 |
| 2022/0277514 A1* | 9/2022 | Yin | G06T 7/529 |
| 2022/0284659 A1* | 9/2022 | Takikawa | G06T 17/005 |
| 2022/0301257 A1* | 9/2022 | Garbin | G06N 3/045 |
| 2022/0309741 A1* | 9/2022 | Barreiro | G06T 15/50 |
| 2022/0309742 A1* | 9/2022 | Bigos | G06T 15/06 |
| 2022/0309743 A1* | 9/2022 | Harviainen | H04N 21/435 |
| 2022/0309745 A1* | 9/2022 | Bigos | G06V 10/7747 |
| 2022/0327320 A1* | 10/2022 | Perincherry | G06V 20/64 |
| 2022/0335636 A1* | 10/2022 | Bi | G06T 7/586 |
| 2022/0335677 A1* | 10/2022 | Sun | G06T 15/506 |
| 2022/0343601 A1* | 10/2022 | Liaudanskas | G06V 10/774 |
| 2022/0351456 A1* | 11/2022 | Harviainen | G06T 15/20 |
| 2022/0392159 A1* | 12/2022 | Delgado | G06F 3/04842 |
| 2023/0027234 A1* | 1/2023 | Wu | G06T 7/194 |
| 2023/0035458 A1* | 2/2023 | Ju | G06T 7/248 |
| 2023/0037958 A1* | 2/2023 | Liba | G06T 7/50 |
| 2023/0041378 A1* | 2/2023 | Abouelela | G06V 10/7715 |
| 2023/0074109 A1* | 3/2023 | Padgett | G06F 1/1686 |
| 2023/0140460 A1* | 5/2023 | Munkberg | G06N 3/045 |
| | | | 345/423 |
| 2023/0145208 A1* | 5/2023 | Bobu | G06N 20/00 |
| | | | 706/12 |
| 2023/0230311 A1* | 7/2023 | Xie | G06T 17/20 |
| | | | 345/426 |
| 2023/0334764 A1* | 10/2023 | Lee | G06T 15/10 |
| 2023/0342944 A1* | 10/2023 | Sullivan | G06V 10/806 |
| 2023/0386107 A1* | 11/2023 | Aluru | G06N 3/04 |
| 2023/0410408 A1* | 12/2023 | Park | G06T 15/06 |
| 2024/0054721 A1* | 2/2024 | Li | G06T 5/20 |
| 2024/0070762 A1* | 2/2024 | Wang | G06V 10/82 |
| 2024/0135634 A1* | 4/2024 | Sagong | G06T 15/205 |
| 2024/0193850 A1* | 6/2024 | Kuang | G06T 15/08 |
| 2024/0257503 A1* | 8/2024 | Moon | G06T 17/00 |
| 2024/0284192 A1* | 8/2024 | Tomie | H04B 17/373 |

OTHER PUBLICATIONS

Korean Office Action Issued on Mar. 26, 2024, in Counterpart Korean Patent Application No. 10-2019-0111734 (7 Pages in English, 10 Pages in Korean).

* cited by examiner

THREE-DIMENSIONAL (3D) RENDERING METHOD AND APPARATUS

CROSS-REFERENCE TO RELATED APPLICATIONS

This application claims the benefit under 35 USC § 119(a) of Korean Patent Application No. 10-2019-0111734, filed on Sep. 9, 2019, in the Korean Intellectual Property Office, the entire disclosure of which is incorporated herein by reference for all purposes.

BACKGROUND

1. Field

The following description relates to a three-dimensional (3D) computer graphics technology.

2. Description of Related Art

A three-dimensional (3D) rendering is a field of computer graphics that renders 3D models. The 3D rendering is being used in various application fields, for example, 3D games, virtual reality, animations, and movies. A 3D rendering technique includes, for example, a ray tracing rendering technique of tracing a route in which light emitted from a light source is reflected from a surface of an object and of rendering a 3D model, a radiosity rendering technique reflecting both a direct illumination effect and an indirect illumination effect that is caused by a diffuse reflection phenomenon or light corresponding to a direct illumination reflected by an object, and a rasterization rendering technique of converting vector data to a pixel pattern image and rendering a 3D model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a three-dimensional (3D) rendering method includes extracting sample points from a 3D scene, acquiring rendering result information for the sample points by rendering the sample points, and generating a rendering result image corresponding to an entire rendering based on the rendering result information for the sample points and feature information of the 3D scene.

The extracting of the sample points may include extracting the sample points using a neural network-based sample point determination model that uses the feature information of the 3D scene as an input and that outputs position information of the sample points extracted from the 3D scene.

The extracting of the sample points may include extracting a minimum number of sample points that allow the rendering result image to be generated in the 3D scene.

The generating of the rendering result image may include acquiring the rendering result image using a neural network-based rendering image generation model that uses, as inputs, the rendering result information for the sample points and the feature information of the 3D scene and that outputs the rendering result image.

The generating of the rendering result image may include estimating rendering result information for points other than the sample points in the 3D scene based on the rendering result information for the sample points and the feature information of the 3D scene.

The estimating of the rendering result information for the points other than the sample points may include estimating a first shading component for the points other than the sample points based on the rendering result information for the sample points, estimating a second shading component for the points other than the sample points, and estimating the rendering result information for the points other than the sample points based on the first shading component and the second shading component.

The estimating of the second shading component may include estimating the second shading component through a graphics processing unit (GPU) pipeline.

The first shading component may be a diffuse reflection component, and the second shading component may be a specular reflection component.

The acquiring of the rendering result information may include rendering the sample points.

The feature information of the 3D scene may include any one or any combination of depth information of 3D models included in the 3D scene, surface normal information of the 3D models, and texture information of the 3D models.

The sample points may correspond to a portion of vertices of 3D models included in the 3D scene.

The 3D scene may be determined by texture atlas data. The acquiring of the rendering result information may include performing rendering based on texture atlas data.

The acquiring of the rendering result information may include acquiring the rendering result information by rendering each of the sample points based on a portion or all of virtual light sources for a rendering.

The acquiring of the rendering result information may include acquiring the rendering result information by rendering each of the sample points based on a portion or all of rays for a rendering.

In another general aspect, a training method includes acquiring a first rendering result image by performing an entire rendering of a 3D scene, determining sample points in the 3D scene using a first neural network-based sample point determination model that uses feature information of the 3D scene as an input, acquiring rendering result information for the sample points by rendering the determined sample points, acquiring a second rendering result image corresponding to the entire rendering using a second neural network-based rendering image generation model that uses, as inputs, the rendering result information for the sample points and the feature information of the 3D scene, and adjusting a parameter of one or both of the sample point determination model and the rendering image generation model based on the first rendering result image and the second rendering result image.

The adjusting of the parameter may include adjusting a parameter of one or both of the sample point determination model and the rendering image generation model to reduce a loss based on whether the second rendering result image acquired based on rendering result information of the sample points satisfies a preset condition, a number of the sample points, and a separation between the sample points in the 3D scene.

In a further general aspect, a 3D rendering apparatus includes at least one processor, wherein the at least one processor controls the 3D rendering apparatus to perform extracting sample points from a 3D scene to be rendered, acquiring rendering result information for the sample points by rendering the sample points, and generating a rendering result image corresponding to an entire rendering based on the rendering result information for the sample points and feature information of the 3D scene.

In a further general aspect, 3D rendering apparatus includes a first processor configured to extract sample points from a 3D scene to be rendered using a neural network, and a second processor configured to generate a rendering result image corresponding to an entire rendering based on rendering result information for the sample points and feature information of the 3D scene.

The second processor may be configured to render the sample points through a GPU pipeline, and the first processor may be configured to estimate rendering result information for points other than the sample points based on the rendering result information for the sample points.

The second processor may be configured to render the sample points through a GPU pipeline, to render points other than the sample points based on the rendering result information for the sample point, and to generate the rendering result image based on results obtained by rendering the sample points and the points other than the sample points.

The first processor may be configured to acquire rendering result information for the sample points by rendering the sample points, and to estimate rendering result information for points other than the sample points based on the rendering result information for the sample points. The second processor may be configured to generate the rendering result image based on the rendering result information for the sample points and the rendering result information for the points other than the sample points.

The first processor may be configured to extract the sample points based on virtual light source information and object information about an object in the 3D scene and to estimate rendering result information for the sample points using a neural network. The second processor may be configured to estimate rendering result information for points other than the sample points based on the rendering result information for the sample points.

In another general aspect, a processor-implemented three-dimensional (3D) rendering method includes extracting a minimum number of sample pixels from a 3D scene that is required for generating a result image; rendering the sample pixels to generate rendering result information; inputting feature information of the 3D scene and the rendering result information to a rendering image generation model that is based on a neural network; and displaying the result image as an output of the rendering image generation model corresponding to an entire rendering.

The rendering image generation model may be configured to estimate color values of pixels other than the sample pixels based on the rendering result information and the feature information, and to determine pixel values of pixels included in the result image.

Other features and aspects will be apparent from the following detailed description, the drawings, and the claims.

Figure 1:
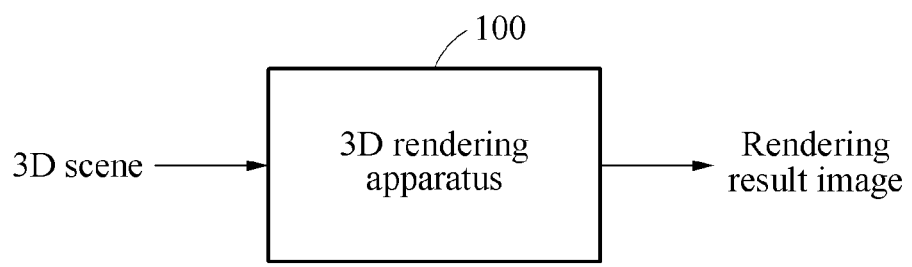
FIG. 1 illustrates an overview of a three-dimensional (3D) rendering apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an overview of a three-dimensional (3D) rendering apparatus 100.

Referring to FIG. 1, the 3D rendering apparatus 100 is an apparatus for performing rendering on a 3D scene, and may be implemented as, for example, a software module, a hardware module, or a combination thereof. The 3D rendering apparatus 100 generates a rendering result image by rendering a 3D scene. For example, the 3D rendering apparatus 100 may include a graphics processing unit (GPU), and may generate a two-dimensional (2D) image from a 3D directing stored in a file of a 3D scene using the GPU. The 3D rendering apparatus 100 may be used in an application, for example, a realistic rendering or an augmented reality (AR) rendering.

A 3D scene is a space in which space relationships between objects are described. The 3D scene is a model of a physical world that may be mathematically expressed by a geometry that describes all points in a 3D space by coordinates. The 3D scene includes at least two objects. Objects may be modeled objects or 3D-modeled 3D models, however, the scope of examples is not limited thereto. The 3D scene is a world in which realistic interactions between objects, for example, physical rules and control rules of force, are simulated.

Rendering is a process or technique of creating an image from a 3D scene that includes objects using a computer program. Rendering of a 3D scene includes a process of applying a visual effect, for example, an illumination effect or a shading effect, to a 3D scene based on light output from at least one virtual light source that is a virtual light source in 3D computer graphics. By applying the illumination effect to the 3D scene, colors of 3D models included in the 3D scene may be determined. By applying the shading effect to the 3D scene, a transparent effect, reflected light or shading caused by an occlusion may be determined. The above effects are based on a characteristic (for example, a direction or color) of light emitted from a virtual light source, characteristics (for example, colors, surface normals or textures) of 3D models, and an arrangement relationship between the visual light source and the 3D models.

A virtual light source includes, for example, a direct virtual light source, and an indirect virtual light source (virtual point light (VPL)). The direct virtual light source is a light source that emits light directly to a 3D model, and the indirect virtual light source is a virtual light source that emits light in a region in which light emitted from a direct virtual light source or another indirect virtual light source is reflected, diffracted or refracted.

A rendering result image generated by a rendering process of the 3D rendering apparatus 100 is a result acquired by rendering a 3D scene, and includes, for example, a digital image or a raster graphic image.

Elements of rendering are largely divided into reflectance and shading. A result of a realistic rendering may be determined based on reflectance and shading. The reflectance is given in information about 3D models and includes color information and texture information of 3D models. Since the shading is based on textures of 3D models and an arrangement relationship between a virtual light source and 3D models, calculation of the shading is complicated. In a shading process, all points of a 3D scene do not require shading of the same density. For example, it is possible to obtain a desired shading effect even with rough sample points for a diffuse reflection material, however, more dense sample points are required for a glossy material or surroundings of shades.

Although sample points with various densities are required based on a texture of a 3D model, a position of a virtual light source and geometric characteristics, it is not easy to predict a density of sample points due to a complexity of a correlation thereof. Depending on examples that will be described below, a neural network-based deep learning model is trained on results obtained by simulations of various rendering conditions through a training process, and a 3D rendering is performed using the trained deep learning model during a real 3D rendering. Thus, it is possible to effectively sample sample points in a 3D scene, and to more quickly perform a 3D rendering with a low complexity without a decrease in a quality of a rendering result image. For example, in a process of training the deep learning model, a training of an interpolation method to restore all rendering result images and a number of sample points to be sampled in a 3D scene is performed, and a rendering of main sample points is performed during a real 3D rendering and all rendering results are restored based on a result of the rendering. Herein, the terms "point" and "sample point" may be replaced by "pixel" and "sample pixel".

Figure 2:
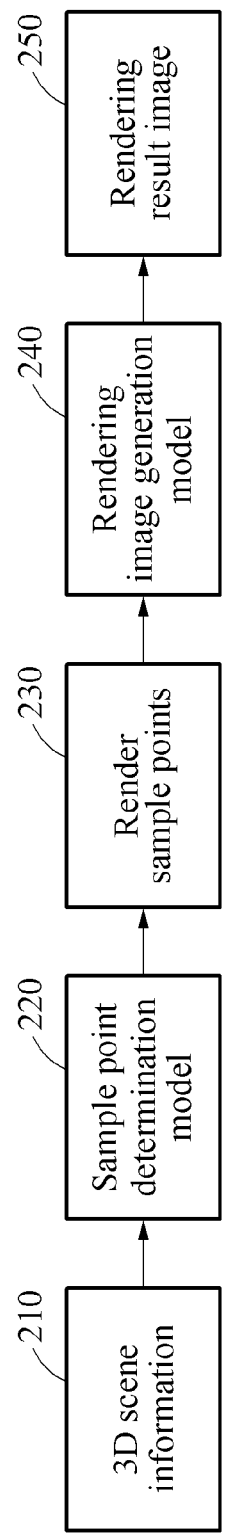
FIG. 2 illustrates an overview of a 3D rendering process.

FIG. 2 illustrates an overview of a 3D rendering process.

Referring to FIG. 2, in a 3D rendering process performed by a 3D rendering apparatus, sampling of sample points based on training for a rendering, and a reconstruction of an entire rendering result image based on a rendering result for sample points are performed. In an example, a portion of sample points that are regarded as main points in a 3D scene may be rendered, and a rendering result image corresponding to an entire rendering may be generated based on a rendering result for the sample points.

In the above 3D rendering process, 3D scene information 210 that is information about a 3D scene is provided. The 3D scene information 210 is information about a 3D scene to be rendered which is provided in advance. The 3D scene information 210 may include, for example, information about an arrangement, a viewpoint, a texture mapping, an illumination or shading of 3D models to express a virtual 3D scene.

The 3D scene information 210 is input to a sample point determination model 220 that is based on a first neural network, and the sample point determination model 220 extracts or samples sample points in the 3D scene based on the input 3D scene information 210. The sample point determination model 220 may have, for example, a neural network structure of an auto encoder. Sample points may correspond to predetermined positions in the 3D scene or correspond to a portion of vertices of 3D models included in the 3D scene.

In operation 230, the extracted sample points are rendered. As a result of the rendering, rendering result information for the sample points is acquired. In a rendering process, a shadow effect and a shading effect are calculated based on a virtual light source set in the 3D scene information 210, and color values and/or shadow values in positions of sample points are determined as rendering result information.

In an example, in a rendering of sample points, shading may be performed based on sample points corresponding to a portion of points and all given virtual light sources or all rays, and color values of the sample points may be determined. In another example, in a rendering of sample points, shading may be performed based on sample points and a portion of given virtual light sources or a portion of rays, and color values of the sample points may be determined.

When the sample points are rendered, feature information extracted from the 3D scene information 210 and the rendering result information for the sample points are input to a rendering image generation model 240 that is based on a second neural network. The rendering image generation model 240 may have, for example, a neural network structure of an auto encoder. The feature information extracted from the 3D scene information 210 includes, for example, depth information, surface normal information and texture information (or material information) associated with 3D models. The depth information is information about a depth or a distance to each point of a 3D model, and the surface normal information is information about a normal direction component on a surface of a 3D model.

The rendering image generation model 240 determines color values of points other than the sample points based on the input information, and generates a rendering result image 250 corresponding to an entire rendering. In this example, shading values of all target points that are to be rendered are restored.

As described above, the 3D rendering apparatus renders sample points corresponding to a portion of points of a 3D scene, instead of rendering all the points for each image frame, and a rendering result for the other points is estimated or restored based on a rendering result for the sample points.

The sample point determination model 220 and the rendering image generation model 240 are trained on a scheme of extracting sample points from a provided 3D scene and a scheme of generating a rendering result image corresponding to an entire rendering based on a rendering result for the extracted sample points in advance, respectively, through a training process that will be described below.

Figure 3:
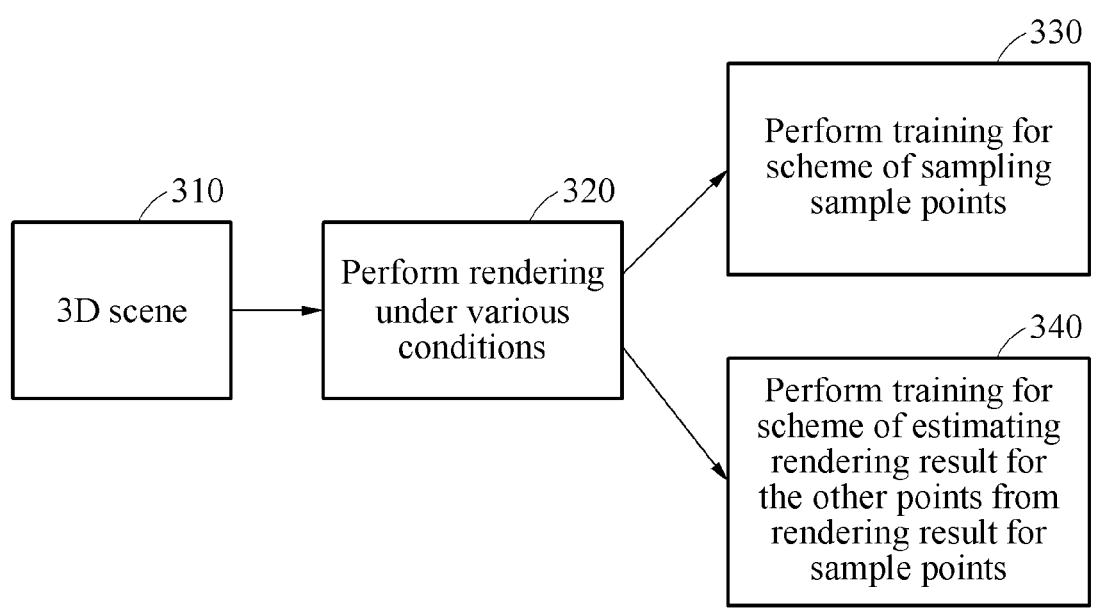
FIGS. 3 and 4 illustrate examples of a training process for deep learning models.

FIG. 3 illustrates an overview of a training process.

Referring to FIG. 3, a 3D scene 310 and feature information of the 3D scene 310 for training are provided as training data. The feature information of the 3D scene 310 includes, for example, information about colors, depths, surface normals, textures and glossiness of 3D models included in the 3D scene 310, classes to distinguish types of 3D models, and/or a material identifier.

In operation 320, a training apparatus renders the 3D scene 310 under various rendering conditions. The various rendering conditions are rendering conditions that vary variable elements, for example, an illumination in the 3D scene 310, and textures and geometrical structures of 3D models in the 3D scene 310. For example, the training apparatus may acquire first rendering result images under various rendering conditions through a realistic rendering simulation. For each of the first rendering result images, a training process including operations 330 and 340 may be performed.

In operation 330, the training apparatus performs training for a scheme of sampling sample points. The training apparatus trains a first neural network-based sample point determination model on how to determine a number of sample points extracted from the 3D scene 310 and positions of the sample points. Through the training process, training for a scheme of sampling sample points to generate a rendering result image corresponding to an entire rendering or to restore a result of the entire rendering is performed.

In operation 340, the training apparatus performs training for a scheme of estimating a rendering result for points other than the sample points from a rendering result for the sample points. The training apparatus trains a second neural network-based rendering image generation model on how to generate a second rendering result image corresponding to the entire rendering based on rendering result information for the sample points and the feature information of the 3D scene 310. Through the training process, training for a correlation between representative sample points and the other points and a scheme of restoring color values of the other points based on the sample points is performed.

The above training process including operations 330 and 340 is performed based on a result of a comparison between the first rendering result images corresponding to a rendering result for all the points acquired in operation 320 and the second rendering result image generated based on a rendering result for a portion of sample points acquired in operation 340. The training process includes a process of adjusting parameters of the sample point determination model and the rendering image generation model so that a difference between the second rendering result image and the first rendering result image decreases, which will be further described with reference to FIG. 4.

Figure 4:
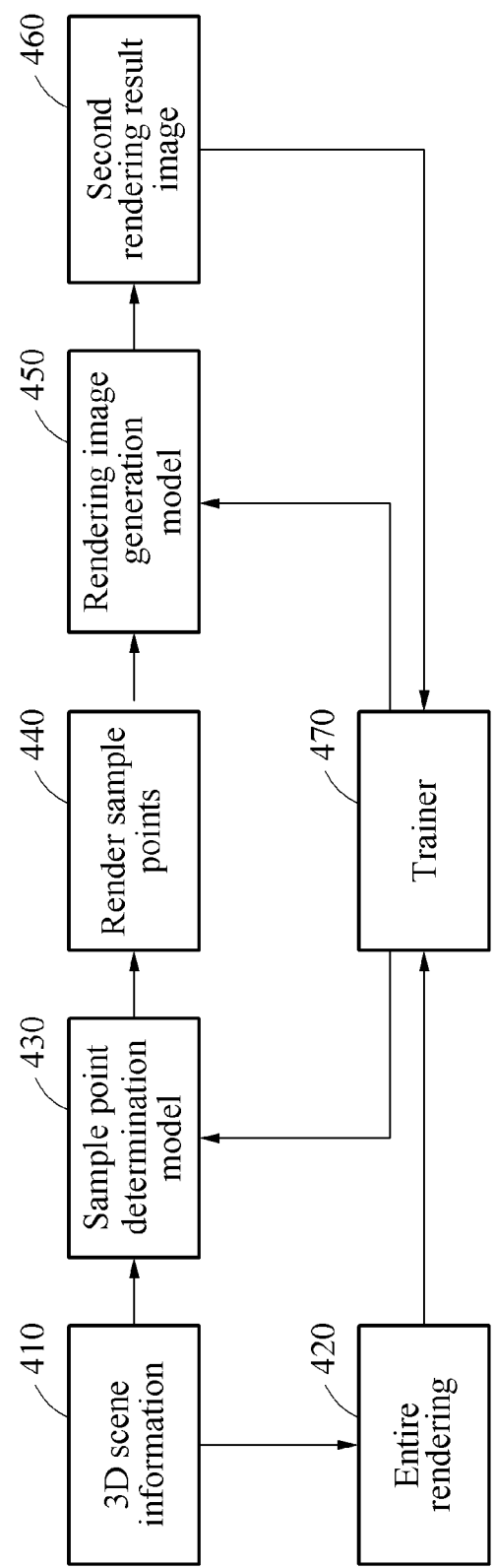

FIG. 4 illustrates an example of a training process.

Referring to FIG. 4, 3D scene information 410 about a 3D scene to be learned is provided. The 3D scene information 410 includes information about characteristics of 3D models included in the 3D scene. The 3D scene information 410 includes, for example, information about colors, depths, surface normals, textures and glossiness of 3D models, classes to distinguish types of 3D models, or a material identifier.

A training apparatus performs an entire rendering 420 based on the 3D scene information 410. The training apparatus acquires various first rendering result images by performing an entire rendering in each of various rendering conditions. For example, the training apparatus acquires first rendering result images by rendering all points (or pixels) of the 3D scene using a ray tracing scheme.

The 3D scene information 410 is input to a sample point determination model 430, and the sample point determination model 430 outputs information about sample points that are to be sampled in the 3D scene, in a form of coordinates or a confidence map, based on a calculation result based on parameters of a neural network. In the confidence map, a confidence value of a position of a point that is to be extracted as a sample point among all points of a 3D space is provided. A place corresponding to a position of a sample point in the confidence map represents a confidence greater than or equal to a threshold. Based on an output of the sample point determination model 430, sample points that are a portion of points that are to be actually rendered among all points of a 3D space are determined.

The training apparatus renders the sample points in operation 440, and acquires rendering result information. For example, the training apparatus calculates a shading result based on the ray tracing scheme for each of the sample points, and stores the calculated shading result as a result obtained by performing a rendering. In this example, a color value of each of the sample points is calculated as a shading result.

Rendering result information for sample points together with feature information of the 3D scene information 410 are transferred to a rendering image generation model 450. The feature information may include, for example, depth information, surface normal information and texture information about 3D models. The rendering image generation model 450 generates a second rendering result image 460 corresponding to an entire rendering based on the input information. The rendering image generation model 450 estimates a shading result of points other than the sample points based on the input information, and generates the second rendering result image 460 based on the estimated shading result.

A trainer 470 included in the training apparatus trains the sample point determination model 430 and the rendering image generation model 450 based on the first rendering result image acquired through the entire rendering 420 and the second rendering result image 460 acquired using the sample point determination model 430 and the rendering image generation model 450. The first rendering result image corresponds to a desired result used in the training process. The trainer 470 adjusts parameters of the sample point determination model 430 and the rendering image generation model 450 based on a difference between the first rendering result image and the second rendering result image 460.

In an example, the trainer 470 calculates a loss based on whether it is possible to restore the second rendering result image 460 by sample points determined by the sample point determination model 430, a concentration and separation between sample points, and a number of points greater than or equal to a threshold in the confidence map, and adjusts parameters of the sample point determination model 430 and the rendering image generation model 450 to reduce the loss.

Generally, when a number of sample points extracted from a 3D scene increases, a number of errors occurring in a restoration of the second rendering result image 460 decreases. When the number of sample points decreases, the number of errors occurring in the restoration of the second rendering result image 460 increases. In other words, the number of sample points and the number of errors are in a trade-off relationship. The training apparatus trains, based on the trade-off relationship, the sample point determination model 430 to determine a number of and positions of optimal sample points enabling a generation of the second rendering result image 460, and trains the rendering image generation model 450 to generate a high-quality rendering result image corresponding to the entire rendering based on rendering result information for the sample points.

Figure 5:
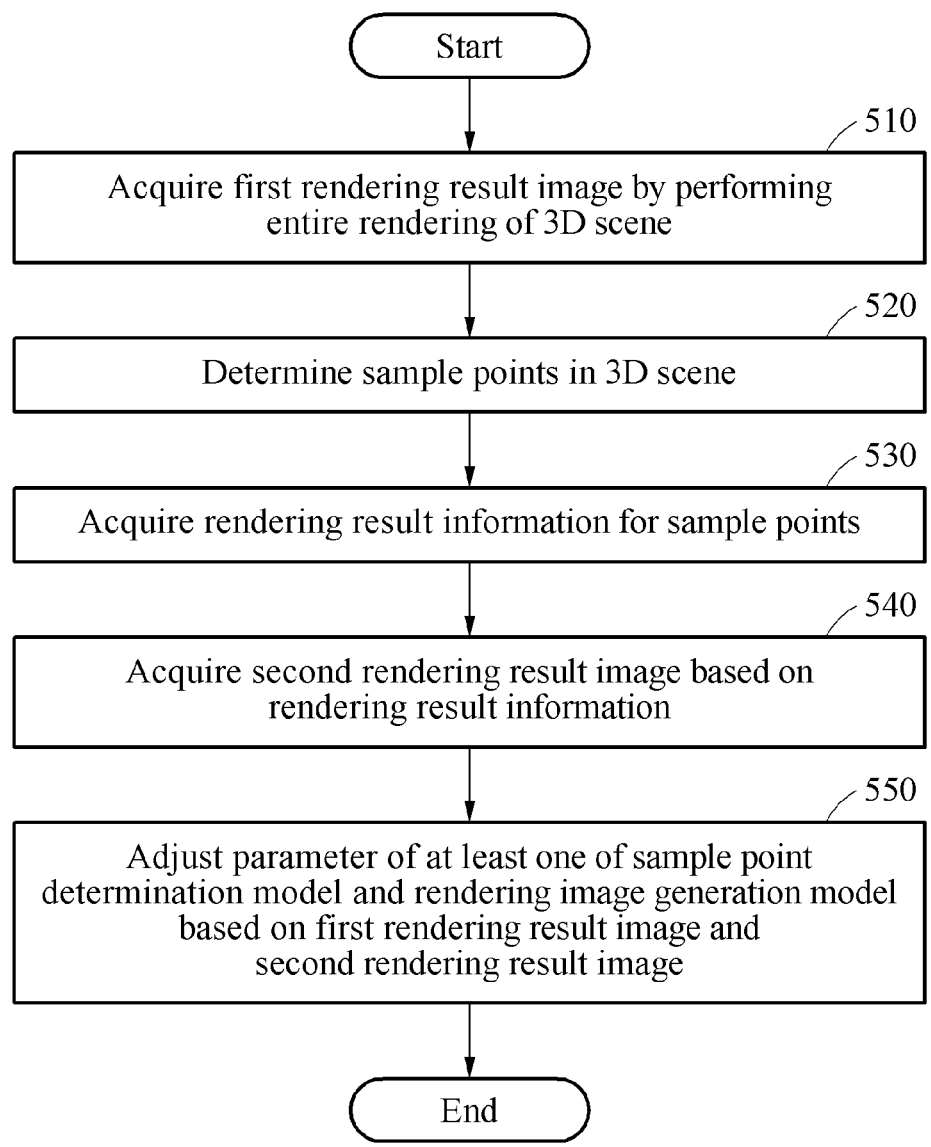
FIG. 5 is a flowchart illustrating an example of operations of a training method.

FIG. 5 is a flowchart illustrating an example of operations of a training method. The training method is performed by, for example, the above-described training apparatus.

Referring to FIG. 5, in operation 510, the training apparatus acquires a first rendering result image by performing an entire rendering of a provided 3D scene. The training apparatus renders a 3D scene under various rendering conditions and acquires first rendering result images under various rendering conditions. The training apparatus repeatedly performs a series of processes of operations 520 through 550 for each of the first rendering result images.

In operation 520, the training apparatus determines sample points that are to be rendered in the 3D scene. The training apparatus determines sample points in the 3D scene using a first neural network-based sample point determination model that uses information about the 3D scene as an input. The information about the 3D scene may include, for example, colors, depths, surface normals, textures and glossiness of 3D models, classes to distinguish types of 3D models, and/or a material identifier. The sample point determination model may sample sample points on which rendering is actually to be performed in the 3D scene, based on the information about the 3D scene.

In operation 530, the training apparatus acquires rendering result information for the sample points by rendering the sample points. The training apparatus calculates a shading result for each of the sample points and acquires the calculated shading result as rendering result information.

In operation 540, the training apparatus acquires a second rendering result image corresponding to an entire rendering based on the rendering result information for the sample points. The training apparatus acquires the second rendering result image using a second neural network-based rendering image generation model that uses the rendering result information for the sample points and feature information of the 3D scene as inputs. The rendering image generation model estimates a shading result of points other than the sample points based on the rendering result information for the sample points and the feature information of the 3D scene, and generates the second rendering result image based on an estimation result.

In operation 550, the training apparatus adjusts a parameter of any one or any combination of the sample point determination model and the rendering image generation model based on the first rendering result image and the second rendering result image. For example, the training apparatus adjusts a parameter of any one or any combination of the sample point determination model and the rendering image generation model to reduce a loss based on whether the second rendering result image acquired based on the rendering result information for the sample points satisfies a preset condition, a number of determined sample points and a concentration or separation between the determined sample points in the 3D scene. In this example, whether the second rendering result image satisfies the preset condition may include, for example, whether an image quality of the second rendering result image satisfies a predetermined condition, or whether a restoration of an entire rendering result image is possible based on the sample points.

Figure 6:
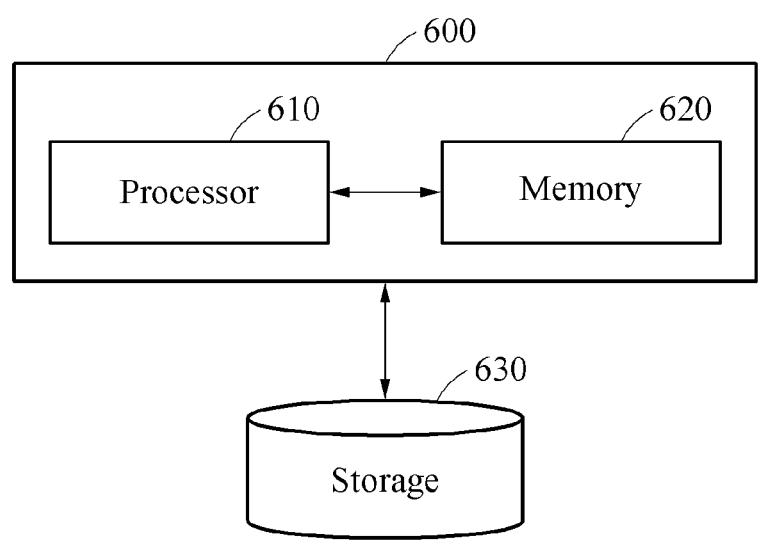
FIG. 6 is a block diagram illustrating an example of a configuration of a training apparatus.

FIG. 6 is a block diagram illustrating an example of a configuration of a training apparatus 600.

Referring to FIG. 6, the training apparatus 600 is an apparatus configured to train deep learning models that may be used in a 3D rendering. A deep learning model includes, for example, a first neural network-based sample point determination model and a second neural network-based rendering image generation model. The training apparatus 600 corresponds to the above-described training apparatus.

The training apparatus 600 includes at least one processor 610 and a memory 620. The memory 620 is connected to the processor 610, and stores instructions executable by the processor 610, data that may be calculated by the processor 610, and/or data processed by the processor 610. Depending on examples, the training apparatus 600 further includes a storage 630, and the storage 630 stores data about a 3D scene that is to be learned, data about a rendering result, and data about deep learning models.

The processor 610 controls the training apparatus 600 to perform the above-described training process. For example, the processor 610 controls the training apparatus 600 to perform an operation of acquiring a first rendering result image by performing an entire rendering of a 3D scene, an operation of determining sample points in the 3D scene using a first neural network-based sample point determination model that uses feature information of the 3D scene as an input, an operation of acquiring rendering result information for the sample points by rendering extracted sample points, an operation of acquiring a second rendering result image corresponding to the entire rendering using a second neural network-based rendering image generation model that uses, as inputs, the rendering result information for the sample points and the feature information of the 3D scene, and an operation of adjusting parameters of any one or any combination of the sample point determination model and the rendering image generation model based on the first rendering result image and the second rendering result image. The processor 610 calculates a loss caused by a difference between the first rendering result image and the second rendering result image and adjusts parameters of the sample point determination model and the rendering image generation model to reduce the calculated loss. The processor 610 gradually adjusts parameters of the sample point determination model and the rendering image generation model to desired values by repeatedly performing the above training process on each first rendering result image.

Figure 7:
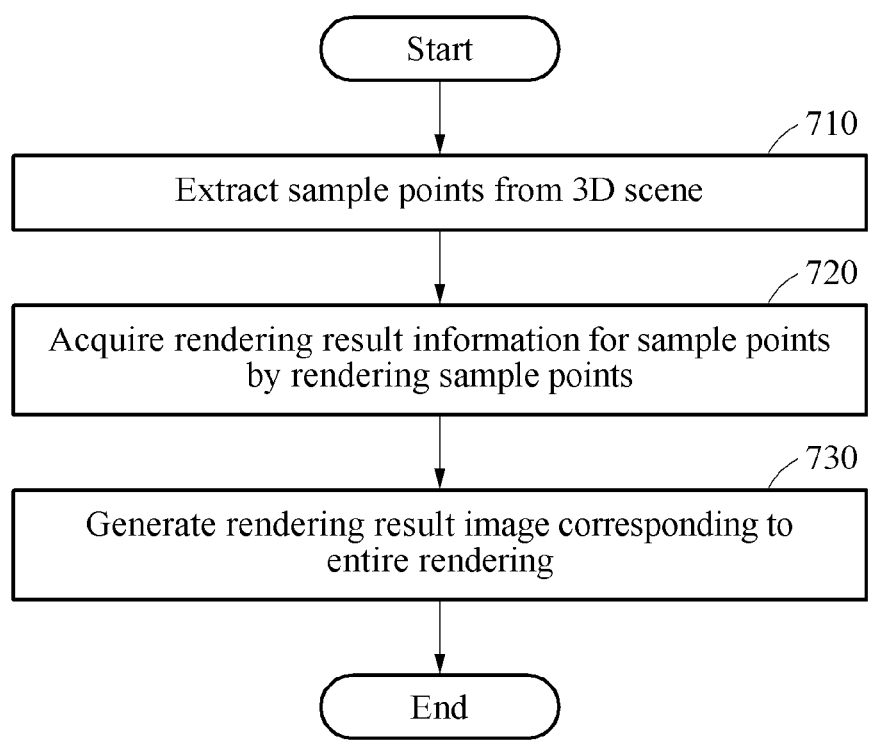
FIG. 7 is a flowchart illustrating an example of operations of a 3D rendering method.

FIG. 7 is a flowchart illustrating an example of operations of a 3D rendering method. The 3D rendering method is performed by, for example, the above-described 3D rendering apparatus.

Referring to FIG. 7, in operation 710, the 3D rendering apparatus extracts sample points from a 3D scene to be rendered. In an example, the extracted sample points may correspond to predetermined positions in the 3D scene. In another example, the extracted sample points may correspond to a portion of vertices of 3D models included in the 3D scene.

For example, the 3D rendering apparatus extracts the sample points using a first neural network-based sample point determination model that uses feature information of the 3D scene as an input and that outputs position information of sample points that may be extracted from the 3D scene. The 3D rendering apparatus extracts a minimum number of sample points allowing a rendering result image to be generated in the 3D scene, using the sample point determination model. The feature information of the 3D scene may include, for example, depth information, surface normal information and texture information of 3D models included in the 3D scene.

In operation 720, the 3D rendering apparatus acquires rendering result information for the sample points by rendering the sample points extracted in operation 710. For example, the 3D rendering apparatus renders the sample points extracted in operation 710 among points of the 3D scene, and acquires rendering result information including shading result information for the sample points. The rendering result information for the sample points may include color information that corresponds to each of the sample points and that is acquired by rendering each of the sample points.

In an example, the 3D rendering apparatus may acquire rendering result information for sample points by rendering each of the sample points based on a portion or all of virtual light sources for a rendering. In another example, when the 3D rendering apparatus performs a rendering using a ray tracing scheme, the 3D rendering apparatus may acquire rendering result information by rendering each of sample points based on a portion or all of rays for a rendering.

In another example, a rendering process is applied to a rendering based on pixels or vertices and is also applied to a rendering based on a texture atlas. A 3D scene is determined by texture atlas data, and the 3D rendering apparatus acquires rendering result information by performing a rendering based on the texture atlas data. The texture atlas data is a data format that unfolds and stores a 3D scene as a 2D texture regardless of a viewpoint. For example, the texture atlas data is obtained by expressing a plurality of images forming a 3D scene as a single 2D texture image. Using the texture atlas data, it is possible to reduce a consumption of resources and to enhance a rendering speed during a rendering process. Also, an example of using the texture atlas data is also applied to a light map, and a scope of use of the light map may be extended through the rendering method.

In operation 730, the 3D rendering apparatus generates a rendering result image corresponding to an entire rendering based on the rendering result information for the sample points and the feature information of the 3D scene. For example, the 3D rendering apparatus acquires the rendering result image using a second neural network-based rendering image generation model that uses, as inputs, the rendering result information for the sample points and the feature information of the 3D scene and that outputs the rendering result image.

The 3D rendering apparatus estimates rendering result information for points other than the sample points in the 3D scene based on the rendering result information for the sample points and the feature information of the 3D scene, using the rendering image generation model.

In an example, the 3D rendering apparatus determines a rendering intermediate result instead of determining final rendering result information (for example, a color value) for the other points using a neural network-based deep learning, and determines the final rendering result information from the rendering intermediate result using another scheme. For example, the 3D rendering apparatus divides a process of acquiring shading components of the other points, to acquire a first shading component by a reconstruction using a deep learning and acquire a second shading component using a GPU pipeline, among the shading components. The first shading component may be, for example, a diffuse reflection component, and the second shading component may be, for example, a specular reflection component. The 3D rendering apparatus estimates a first shading component for points other than sample points based on rendering result information for the sample points, estimates a second shading component for the other points, and estimates rendering result information for the other points based on the first shading component and the second shading component. The first shading component corresponds to a rendering intermediate result, and the 3D rendering apparatus estimates the first shading component for the other points using a trained neural network. The 3D rendering apparatus estimates the second shading component for the other points using the GPU pipeline, and estimates the rendering result information for the other points by combining the first shading component and the second shading component.

The 3D rendering apparatus extracts a small number of sample points from the 3D scene through the above process, and restores the rendering result image corresponding to the entire rendering based on a rendering result for the extracted sample points, to extremely quickly perform a 3D rendering with a low complexity.

Figure 8:
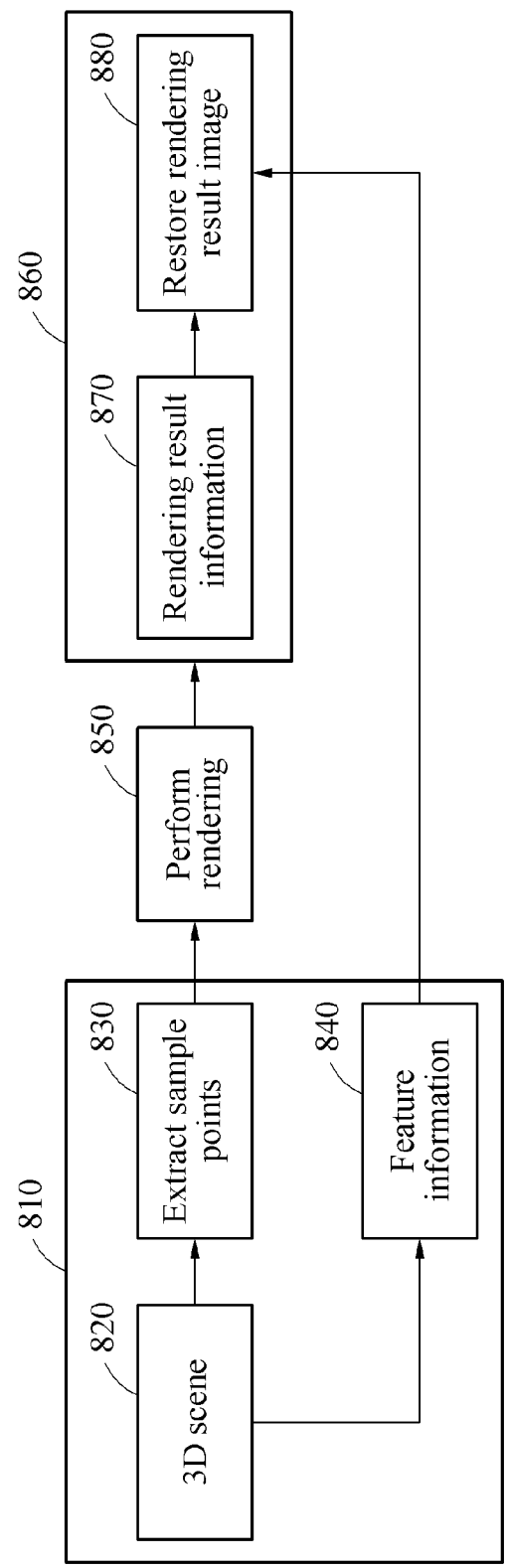
FIG. 8 illustrates an example of a 3D rendering process.

FIG. 8 illustrates an example of a 3D rendering process.

Referring to FIG. 8, the 3D rendering process broadly includes a process 810 of extracting sample points from a 3D scene 820, a process 850 of rendering the extracted sample points, and a process 860 of generating a rendering result image based on rendering result information for the sample points.

In operation 830 of the process 810, a 3D rendering apparatus extracts the sample points from the 3D scene 820 on which 3D rendering is to be performed. Also, the 3D rendering apparatus extracts, from the 3D scene 820, feature information 840, for example, depth information, surface normal information and texture information of 3D models.

The 3D rendering apparatus extracts a minimum number of sample points allowing a restoration of an entire rendering image based on depth information, surface normal information and texture information of 3D models included in the 3D scene 820. The 3D rendering apparatus extracts points that are to be determined as sample points from points in the 3D scene 820 using a sample point determination model that is trained. For example, the sample point determination model is trained so that a relatively large number of sample points is extracted in a portion in which a surface normal rapidly changes and that a relatively small number of sample points is extracted in a portion in which a surface normal slightly changes. The 3D rendering apparatus adaptively extracts sample points based on the 3D scene 820 using the sample point determination model.

In the process 850, the 3D rendering apparatus renders the extracted sample points. Through the rendering, color values of the sample points are determined.

In operation 880 of the process 860, the 3D rendering apparatus restores a rendering result image corresponding to an entire rendering based on rendering result information 870 derived through a rendering of the sample points and based on the feature information 840 derived from the 3D scene 820. The 3D rendering apparatus acquires the rendering result image from the rendering result information 870 and the feature information 840 using a rendering image generation model that is trained. The rendering image generation model estimates color values of points other than the sample points based on the rendering result information 870 and the feature information 840, and determines pixel values of pixels included in the rendering result image. As described above, the 3D rendering apparatus uses a portion of rendering results to restore the other rendering results.

Figure 9A:
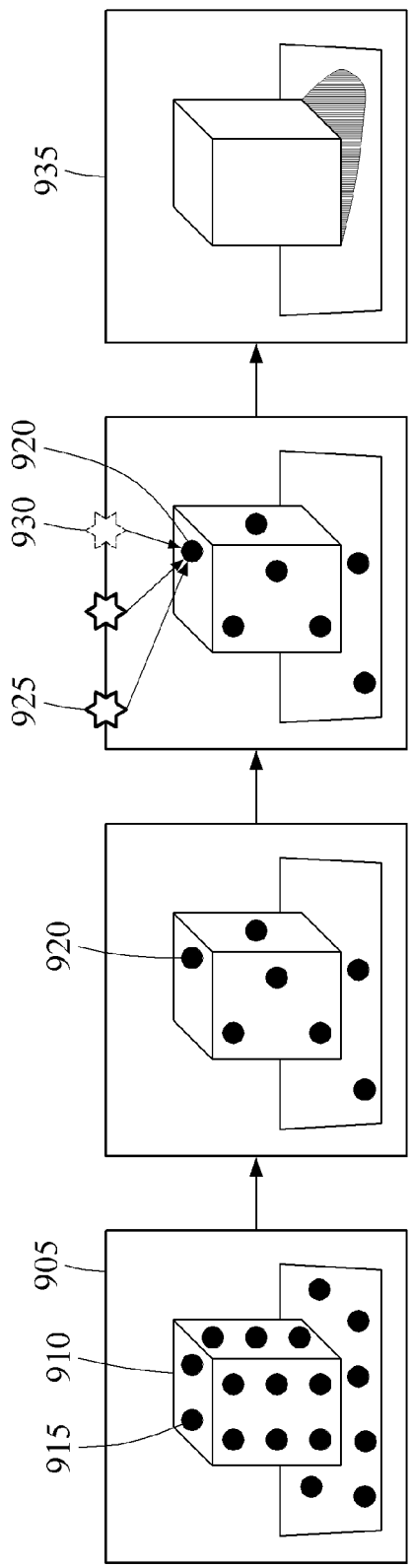
FIG. 9A illustrates an example of a 3D rendering process.

FIG. 9A illustrates an example of a 3D rendering process.

Referring to FIG. 9A, a 3D scene 905 is a space in which space relationships between objects, for example, a 3D model 910, are described. A 3D rendering apparatus extracts a portion of points 915 as sample points 920 for performing a rendering from the 3D scene 905. The 3D rendering apparatus determines a position of a sample point 920 in the 3D scene 905 using a sample point determination model that is trained. The sample point determination model determines positions of a smallest number of sample points used to generate a rendering result image in a provided 3D scene, and provides information on the determined positions of the sample points.

The 3D rendering apparatus renders the sample points 920 based on virtual light sources 925, or rays that are based on a ray tracing scheme. To render the sample points 920, the 3D rendering apparatus uses a portion or all of the virtual light sources 925, or a portion or all of the rays. The 3D rendering apparatus does not calculate a shading effect caused by a particular virtual light source 930 or does not reflect the shading effect to a rendering result in a process of rendering the sample points 920. By taking into consideration a portion of virtual light sources or a portion of rays, it is possible to reduce a computational complexity and to more quickly perform a 3D rendering.

The 3D rendering apparatus generates a rendering result image 935 corresponding to an entire rendering based on rendering result information for the sample points 920 and feature information of the 3D scene 905. The 3D rendering apparatus acquires the rendering result image 935 using a rendering image generation model that provides a rendering result image using the rendering result information for the sample points 920 and the feature information of the 3D scene 905 as inputs.

Figure 9B:
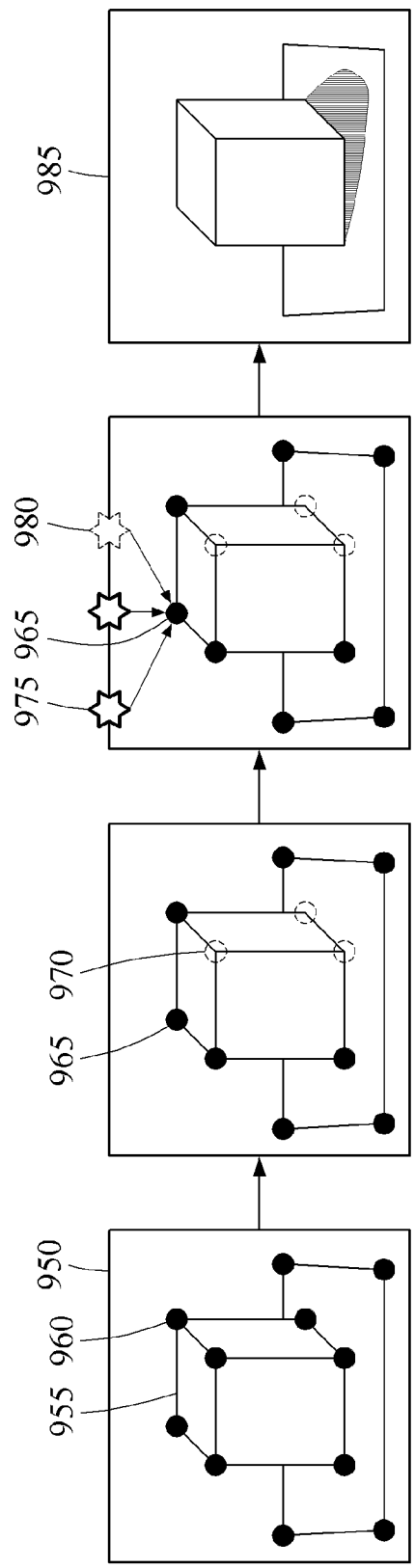
FIG. 9B illustrates another example of a 3D rendering process.

FIG. 9B illustrates another example of a 3D rendering process.

In the example of FIG. 9B, sample points are extracted from vertices of a 3D model. For example, the sample points may correspond to a portion of vertices of 3D models included in a 3D scene.

In a provided 3D scene 950, a 3D model 955 includes a plurality of vertices 960. A 3D rendering apparatus extracts a vertex 965 that is to be rendered from the vertices 960 of the 3D model 955. The 3D rendering apparatus extracts the vertex 965 using a sample point determination model that uses feature information of the 3D scene 950 as an input. Vertices 970 other than the extracted vertex 965 are not rendered.

The 3D rendering apparatus renders the extracted vertex 965 based on virtual light sources 975, or rays that are based on a ray tracing scheme. To render the vertex 965, the 3D rendering apparatus uses a portion or all of the virtual light sources 975, or a portion or all of the rays. For example, the 3D rendering apparatus does not calculate a shading effect caused by a predetermined virtual light source 980 or does not reflect a rendering result in the rendering of the vertex 965.

Similar to the example of FIG. 9A, the 3D rendering apparatus generates a rendering result image 985 corresponding to an entire rendering based on rendering result information for the rendered vertex 965 and the feature information of the 3D scene 950. The 3D rendering apparatus acquires the rendering result image 985 using a trained rendering image generation model.

Figure 10:
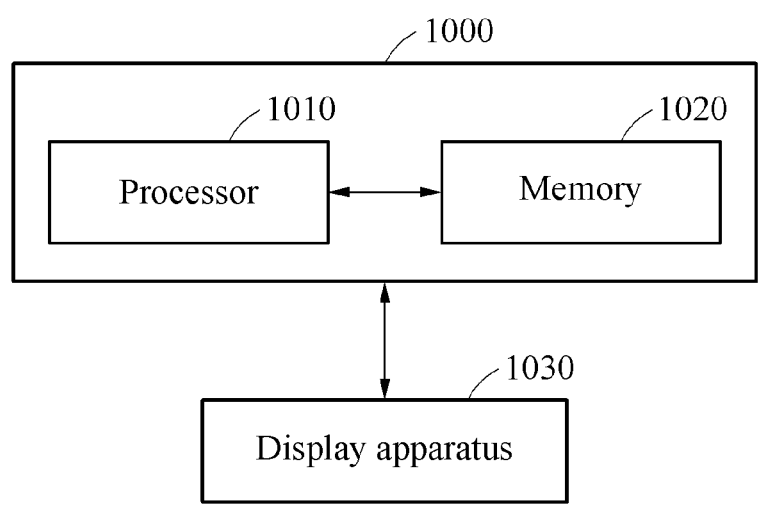
FIG. 10 is a block diagram illustrating an example of a configuration of a 3D rendering apparatus.

FIG. 10 is a block diagram illustrating an example of a configuration of a 3D rendering apparatus 1000.

Referring to FIG. 10, the 3D rendering apparatus 1000 includes at least one processor 1010 and a memory 1020. The 3D rendering apparatus 1000 corresponds to, for example, the above-described 3D rendering apparatus.

The memory 1020 stores instructions readable in a computer, information used in the above-described 3D rendering process and result information. For example, the memory 1020 includes a non-transitory computer-readable medium, for example, a high-speed random access memory (RAM) and/or a non-volatile computer-readable storage medium (for example, at least one disk storage devices, flash memory devices or other non-volatile solid state memory devices).

The processor 1010 controls an overall operation of the 3D rendering apparatus 1000 and processes at least one operation of the above-described 3D rendering method. It will be understood by one of ordinary skill in the art that the processor 1010 may be implemented as an array of a plurality of logic gates, or as another type of hardware. Also, the processor 1010 includes at least one GPU to perform a rendering of a 3D scene.

When instructions stored in the memory 1020 are executed in the processor 1010, the processor 1010 controls the 3D rendering apparatus 1000 so that the 3D rendering apparatus 1000 performs at least one operations described above. For example, the processor 1010 controls the 3D rendering apparatus 1000 so that the 3D rendering apparatus 1000 performs an operation of extracting sample points from a 3D scene to be rendered, an operation of acquiring rendering result information for the extracted sample points by rendering the extracted sample points, and an operation of generating a rendering result image corresponding to an entire rendering based on the rendering result information for the sample points and feature information of the 3D scene.

To extract the sample points, the processor 1010 uses a first neural network-based sample point determination model that uses the feature information of the 3D scene as an input and that outputs position information of sample points that are to be extracted from the 3D scene. Also, to generate the rendering result image, the processor 1010 uses a second neural network-based rendering image generation model that uses the rendering result information for the sample points and the feature information of the 3D scene as inputs and that outputs the rendering result image based on the rendering result information and the feature information.

To acquire the rendering result information for the sample points, the processor 1010 renders each of the sample points based on a portion or all of virtual light sources for a rendering, or based on a portion or all of rays for a rendering.

Also, the processor 1010 performs any one or any combination of the operations described above with reference to FIGS. 1 through 9B, and further description is not repeated.

For example, the processor 1010 included in the 3D rendering apparatus 1000 includes a first processor and a second processor that divide and process an entire rendering process. For example, the first processor may be a unit configured to perform a rendering operation using a neural network, and the second processor may be a GPU. The first processor may extract sample points from a 3D scene that is to be rendered using the neural network. The second processor may generate a rendering result image corresponding to the entire rendering based on rendering result information for the extracted sample points and feature information of the 3D scene.

In an example, the first processor extracts sample points using a neural network, and the second processor acquires rendering result information for the sample points by rendering the sample points through a GPU pipeline. The first processor estimates rendering result information for points other than the sample points based on the rendering result information for the sample points, and the second processor generates a rendering result image corresponding to the entire rendering based on the rendering result information for the sample points and the estimated rendering result information.

In another example, the first processor extracts sample points using a neural network, and the second processor acquires rendering result information for the sample points by rendering the sample points through a GPU pipeline. The second processor renders points other than the sample points based on the rendering result information for the sample points, and generates a rendering result image based on results obtained by rendering the sample points and the other points.

In still another example, the first processor extracts sample points using a neural network, and the second processor acquires rendering result information for the sample points by rendering the extracted sample points. The first processor estimates rendering result information for points other than the sample points based on the rendering result information for the sample points, and the second processor generates a rendering result image based on the rendering result information for the sample points and the estimated rendering result information.

In yet another example, the first processor estimates rendering result information for sample points using a neural network, and the second processor estimates rendering result information for points other than the sample points by performing an interpolation operation based on the rendering result information for the sample points. The first processor extracts sample points based on virtual light source information and object information about an object in a 3D scene, and estimates the rendering result information for the sample points using the neural network. In this example, the virtual light source information includes motion information of a virtual light source in a 3D rendering, and the object information includes motion information of the object. The second processor estimates rendering result information for points other than the sample points based on the rendering result information for the sample points. The second processor estimates color values or feature values of the other points through the interpolation operation based on color values or feature values of the sample points.

In a further example, as described in FIG. 7, the 3D rendering apparatus 1000 determines only a rendering intermediate result for points other than sample points using a neural network, and determines final rendering result information from the rendering intermediate result using another scheme. In this example, the first processor estimates a first shading component for the other points using the neural network. The second processor estimates a second shading component for the other points through a GPU pipeline and estimates rendering result information for the other points based on the first shading component and the second shading component.

Depending on examples, the 3D rendering apparatus 1000 further includes a display apparatus 1030. The display apparatus 1030 may display a rendering result image.

The 3D rendering apparatuses 100 and 1000, the training apparatus 600, and other apparatuses, units, modules, devices, and other components described herein with respect to FIGS. 1, 6 and 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 to 5, 7 8, 9A, and 9B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) rendering method performed by a 3D rendering apparatus, the 3D rendering method comprising:
   extracting, from a 3D scene, some points from among a plurality of points as sample points for rendering the plurality of points of the 3D scene, based on texture information of the 3D scene such that a density of the extracted sample points is greater for a greater diffuse reflection of the 3D scene;
   acquiring, by rendering the sample points, rendering result information corresponding to the sample points; and
   generating, based on the rendering result information and feature information corresponding to the plurality of points of the 3D scene, a rendering result image corresponding to an entire rendering of the plurality of points,
   wherein the extracted sample points include one or more points of each of plural 3D models, respectively, less than all points of each of the 3D models, in a three-dimensional space by coordinates, and the extracted sample points correspond to a portion of vertices of the 3D models included in the 3D scene,
   wherein the extracting of the sample points comprises extracting the sample points using a neural network-based sample point determination model configured to extract the sample points with at least one select density inferred by the sample point determination model based on feature information of the 3D scene provided to the sample point determination model.

2. The 3D rendering method of claim 1, wherein the extracting of the sample points comprises:

extracting the sample points using the sample point determination model that uses the feature information of the 3D scene; and outputting position information of the sample points from the 3D scene.

3. The 3D rendering method of claim 1, wherein the extracting of the sample points comprises extracting a minimum number of sample points that allow the rendering result image to be generated in the 3D scene.

4. The 3D rendering method of claim 1, wherein the generating of the rendering result image comprises:

acquiring the rendering result image using a neural network-based rendering image generation model that uses the rendering result information for the sample points and the feature information of the 3D scene as inputs; and outputting the rendering result image.

5. The 3D rendering method of claim 1, wherein the generating of the rendering result image comprises estimating rendering result information for points other than the sample points in the 3D scene based on the rendering result information for the sample points and the feature information of the 3D scene.

6. The 3D rendering method of claim 5, wherein the estimating of the rendering result information for the points other than the sample points comprises:

estimating a first shading component for the points other than the sample points based on the rendering result information for the sample points;

estimating a second shading component for the points other than the sample points; and estimating the rendering result information for the points other than the sample points based on the first shading component and the second shading component.

7. The 3D rendering method of claim 6, wherein the estimating of the first shading component comprises estimating the first shading component using a neural network.

8. The 3D rendering method of claim 6, wherein the estimating of the second shading component comprises estimating the second shading component through a graphics processing unit (GPU) pipeline.

9. The 3D rendering method of claim 6, wherein the first shading component is a diffuse reflection component, and the second shading component is a specular reflection component.

10. The 3D rendering method of claim 1, wherein the feature information of the 3D scene comprises any one or any combination of depth information of the 3D models included in the 3D scene, surface normal information of the 3D models, and the texture information of the 3D scene of the 3D models.

11. The 3D rendering method of claim 1, wherein the rendering result information for the sample points comprises color information corresponding to each of the sample points acquired by rendering each of the sample points.

12. The 3D rendering method of claim 1, wherein the sample points indicate predetermined positions in the 3D scene, and the rendering result information for the sample points comprises shading result information for the sample points.

13. The 3D rendering method of claim 1, wherein the 3D scene is determined by texture atlas data, and acquiring the rendering result information comprises performing a rendering based on the texture atlas data.

14. The 3D rendering method of claim 1, wherein the acquiring of the rendering result information comprises acquiring the rendering result information by rendering each of the sample points based on a portion or all of virtual light sources for a rendering.

15. The 3D rendering method of claim 1, wherein the acquiring of the rendering result information comprises acquiring the rendering result information by rendering each of the sample points based on a portion or all of rays for a rendering.

16. A non-transitory computer-readable medium storing instructions that, when executed by a processor, cause the processor to perform the method of claim 1.

17. A training method comprising:

acquiring a first rendering result image by performing an entire rendering of a three-dimensional (3D) scene;

determining some points from among a plurality of points in the 3D scene as sample points in the 3D scene for rendering the plurality of points of the 3D scene such that a density of the extracted sample points is greater for a greater diffuse reflection of the 3D scene, the determining of the sample points is performed by using a first neural network-based sample point determination model that uses texture information of feature information corresponding to the plurality of points of the 3D scene as an input;

acquiring, by rendering the determined sample points, rendering result information corresponding to the sample points;

acquiring a second rendering result image corresponding to an entire rendering of the plurality of points, the acquiring of the second rendering result image is performed by using a second neural network-based rendering image generation model provided the rendering result information of the determined sample points and the feature information corresponding to the plurality of points of the 3D scene as input; and adjusting, based on a result of a comparison between the first rendering result image and the second rendering result image, a parameter of one or both of the sample point determination model and the rendering image generation model, wherein the determined sample points include one or more points of each of plural 3D models, respectively, less than all points of each of the 3D models, in a three-dimensional space by coordinates, and the determined sample points correspond to a portion of vertices of the 3D models included in the 3D scene, wherein the adjusting of the parameter comprises adjusting a parameter of one or both of the sample point determination model and the rendering image generation model to reduce a loss, where the loss is determined based on the result of the comparison, a number of the sample points, and the density of the extracted sample points in the 3D scene.

18. The training method of claim 17, wherein the adjusting of the parameter comprises adjusting parameters of the sample point determination model to train the sample point determination model to extract select sample points according to at least one select density based on the feature information provided to the sample point determination model.

19. A three-dimensional (3D) rendering apparatus comprising:

at least one processor, wherein the at least one processor controls the 3D rendering apparatus to perform:

extracting, from a 3D scene, some points from among a plurality of points in the 3D scene as sample points for rendering the plurality of points of the 3D scene such that a density of the extracted sample points is greater for a greater diffuse reflection of the 3D scene, based on texture information of the 3D scene;

generating, by rendering the sample points, rendering result information corresponding to the sample points; and generating, based on the rendering result information and feature information corresponding to the plurality of points of the 3D scene, a rendering result image corresponding to an entire rendering of the plurality of points, wherein the extracted sample points include one or more points of each of plural 3D models, respectively, less than all points of each of the 3D models, in a three-dimensional space by coordinates, and the extracted sample points correspond to a portion of vertices of the 3D models included in the 3D scene, wherein the extracting of the sample points comprises extracting the sample points using a neural network-based sample point determination model configured to extract the sample points with at least one select density inferred by the sample point determination model based on feature information of the 3D scene provided to the sample point determination model.

20. The 3D rendering apparatus of claim 19, wherein the extracting of the sample points comprises:
   extracting the sample points using the sample point determination model that uses the feature information of the 3D scene as an input; and
   outputting position information of the sample points from the 3D scene.

21. The 3D rendering apparatus of claim 19, wherein the generating of the rendering result image comprises:
   acquiring, as inputs, the rendering result image using a neural network-based rendering image generation model that uses the rendering result information for the sample points and the feature information of the 3D scene; and
   outputting the rendering result image.

22. The 3D rendering apparatus of claim 19, wherein the acquiring of the rendering result information comprises acquiring the rendering result information by rendering each of the sample points based on a portion or all of virtual light sources for a rendering.

23. The 3D rendering apparatus of claim 19, wherein the acquiring of the rendering result information comprises acquiring the rendering result information by rendering each of the sample points based on a portion or all of rays for a rendering.

24. A three-dimensional (3D) rendering apparatus comprises:
   a first processor configured to extract, from a 3D scene using a neural network, some points from among a plurality of points in the 3D scene as sample points for rendering the plurality of points of the 3D scene such that a density of the extracted sample points is greater for a greater diffuse reflection of the 3D scene, based on texture information of the 3D scene; and
   a second processor configured to generate, based on rendering result information corresponding to the sample points and feature information of the 3D scene, a rendering result image corresponding to an entire rendering of the plurality of points, wherein the extracted sample points include one or more points of each of plural 3D models, respectively, less than all points of each of the 3D models, in a three-dimensional space by coordinates, and the extracted sample points correspond to a portion of vertices of the 3D models included in the 3D scene, wherein the first processor is configured to estimate a first shading component for points other than the sample points using a neural network.

25. The 3D rendering apparatus of claim 24, wherein
the second processor is configured to render the sample points through a graphics processing unit (GPU) pipeline, and
the first processor is configured to estimate rendering result information for points other than the sample points based on the rendering result information.

26. The 3D rendering apparatus of claim 25, wherein the second processor is configured to generate the rendering result image based on the rendering result information and the rendering result information for the points other than the sample points.

27. The 3D rendering apparatus of claim 24, wherein the second processor is configured to:
   render the sample points through a graphics processing unit (GPU) pipeline;
   render points other than the sample points based on the rendering result information; and
   generate the rendering result image based on results obtained by rendering the sample points and the points other than the sample points.

28. The 3D rendering apparatus of claim 24, wherein the first processor is configured to:
   acquire rendering result information corresponding to the sample points by rendering the sample points; and
   estimate rendering result information corresponding to points other than the sample points based on the rendering result information corresponding to the sample points, and
   wherein the second processor is configured to generate the rendering result image based on the rendering result information corresponding to the sample points and the rendering result information corresponding to the points other than the sample points.

29. The 3D rendering apparatus of claim 24, wherein the second processor is configured to estimate a second shading component for the points other than the samples points through a graphics processing unit (GPU) pipeline and to estimate rendering result information corresponding to the points other than the sample points based on the first shading component and the second shading component.

30. The 3D rendering apparatus of claim 24, wherein the second processor is a graphics processing unit (GPU).

31. The 3D rendering apparatus of claim 24, wherein the first processor is configured to:
   extract the sample points based on virtual light source information and object information about an object in the 3D scene; and
   estimate rendering result information corresponding to the sample points using a neural network, and
   wherein the second processor is configured to estimate rendering result information corresponding to points other than the sample points based on the rendering result information corresponding to the sample points.

* * * * *